United States Patent
Tsuyoshi

[11] Patent Number: 5,995,183
[45] Date of Patent: Nov. 30, 1999

[54] ANISOTROPIC SCATTERING DEVICE AND ITS USE

[75] Inventor: Uemura Tsuyoshi, Kadoma, Japan

[73] Assignee: Matsushita Electric Industrial Co., Ltd., Osaka, Japan

[21] Appl. No.: 08/813,683

[22] Filed: Mar. 7, 1997

[30] Foreign Application Priority Data

Mar. 8, 1996 [JP] Japan .................................. 8-051251

[51] Int. Cl.⁶ .................................................... G02F 1/13
[52] U.S. Cl. .............................. 349/112; 349/86; 349/87; 349/96
[58] Field of Search ........................... 349/86, 87, 112, 349/89, 96

[56] References Cited

U.S. PATENT DOCUMENTS

| | | | |
|---|---|---|---|
| 4,685,771 | 8/1987 | West et al. | 349/87 |
| 4,688,900 | 8/1987 | Doanne et al. | 349/87 |
| 5,113,270 | 5/1992 | Fergason | 349/87 |
| 5,331,446 | 7/1994 | Hirai et al. | 349/86 |
| 5,471,237 | 11/1995 | Tedesco et al. | 359/30 |
| 5,751,388 | 5/1998 | Larson | 349/87 |
| 5,783,120 | 7/1998 | Ouderkirk et al. | 264/1.34 |

*Primary Examiner*—William L. Sikes
*Assistant Examiner*—Toan Ton
*Attorney, Agent, or Firm*—Wenderoth, Lind & Ponack, L.L.P.

[57] ABSTRACT

The anisotropic scattering device is intended to make an attempt of realizing higher luminance of a liquid crystal display by using an anisotropic scattering device in which an anisotropic scattering particle is arranged. The anisotropic scattering particle is dispersed in a liquid crystal matrix, and the particle is arranged in the same direction as a stretching direction of a liquid crystal molecule. Furthermore, the anisotropic scattering particle is oriented in one direction by mixing the anisotropic scattering particle with a resin, followed by stretching. A scattering particle having an aspect ratio of 1 or more shows an anisotropy to a polarizing component. These anisotropic scattering devices are used in combination so that a scattering axis thereof is allowed to intersect perpendicularly to a polarized light axis on the side where light is incident on a liquid crystal panel from a light source.

55 Claims, 14 Drawing Sheets

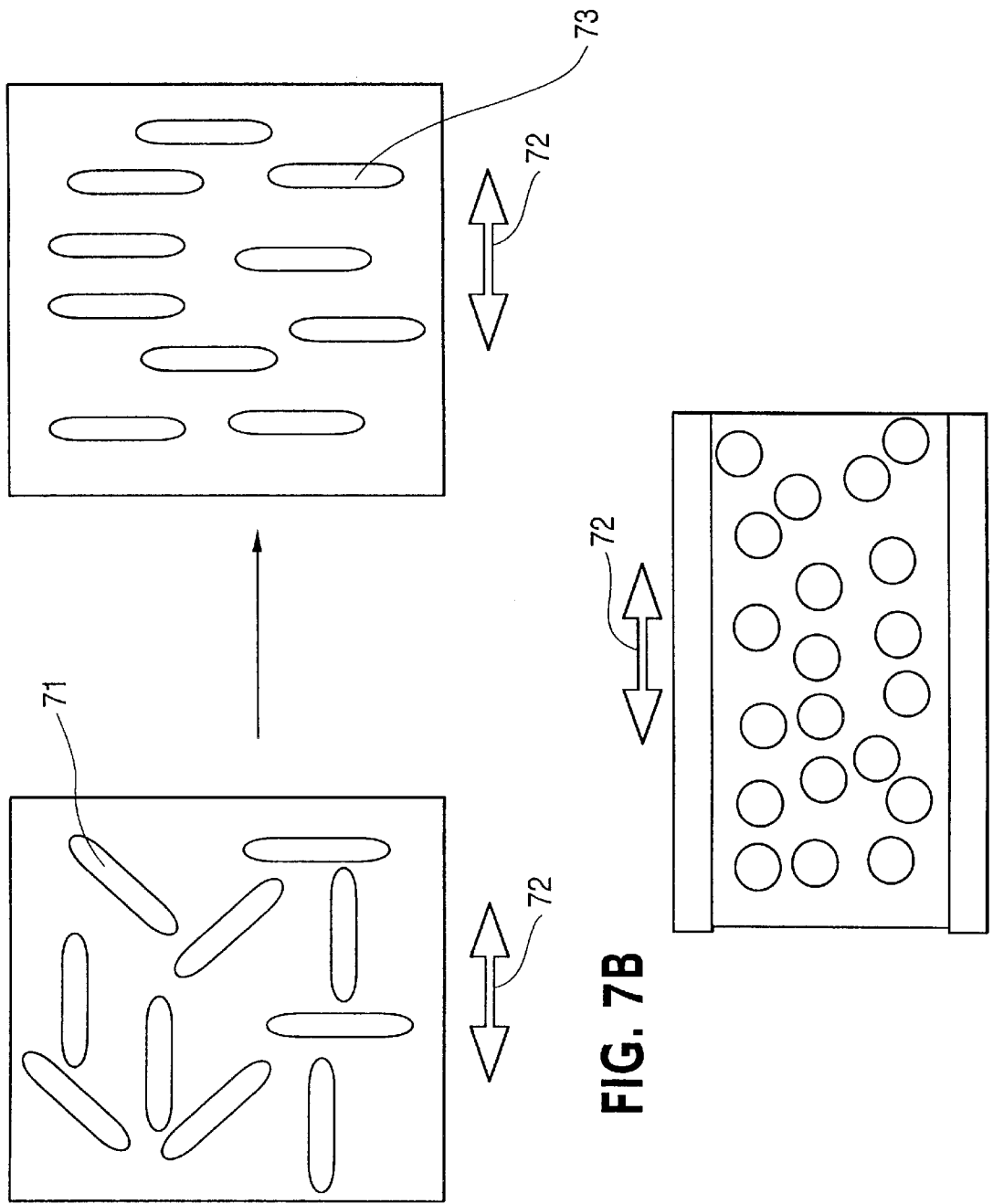

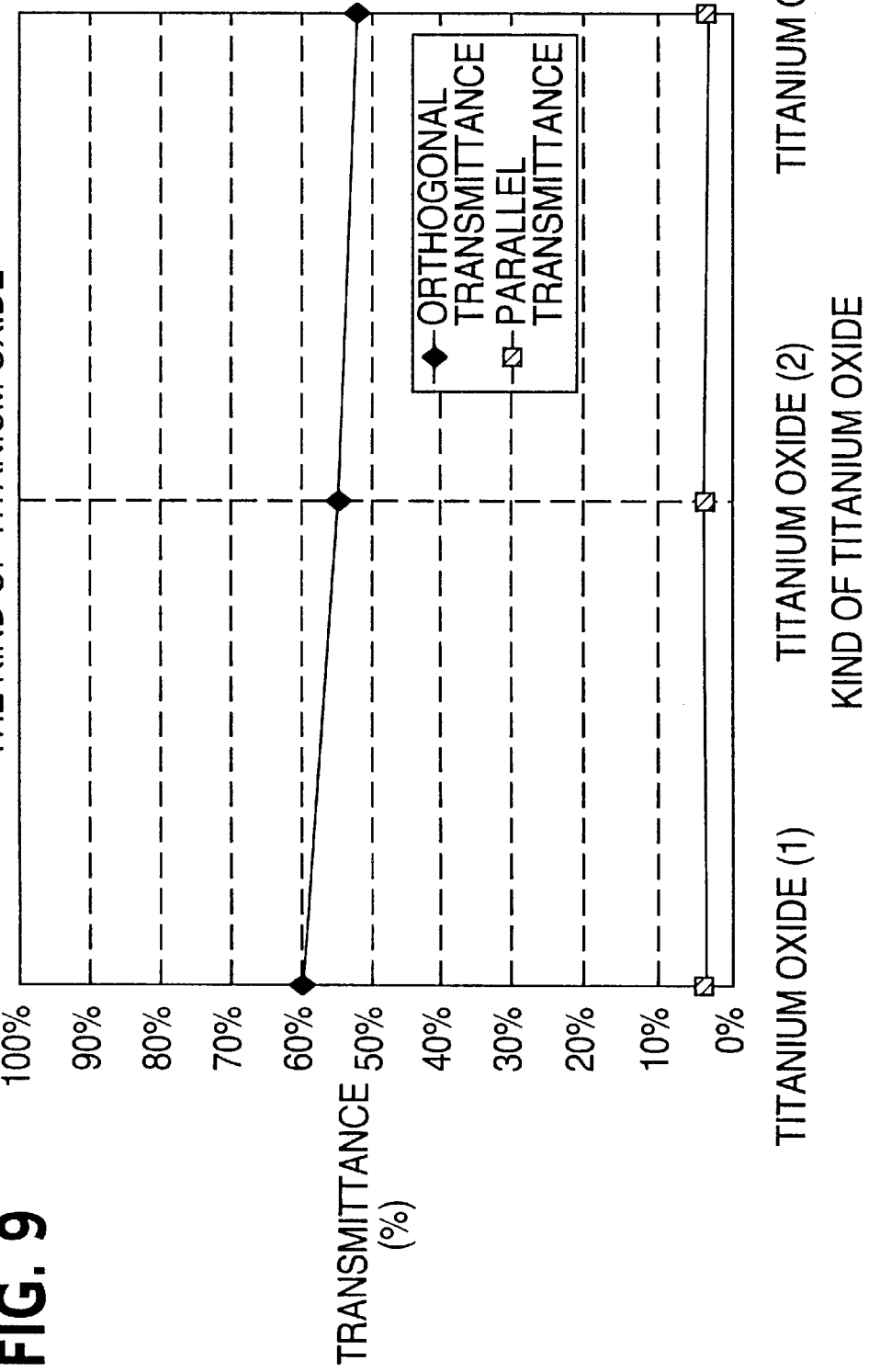

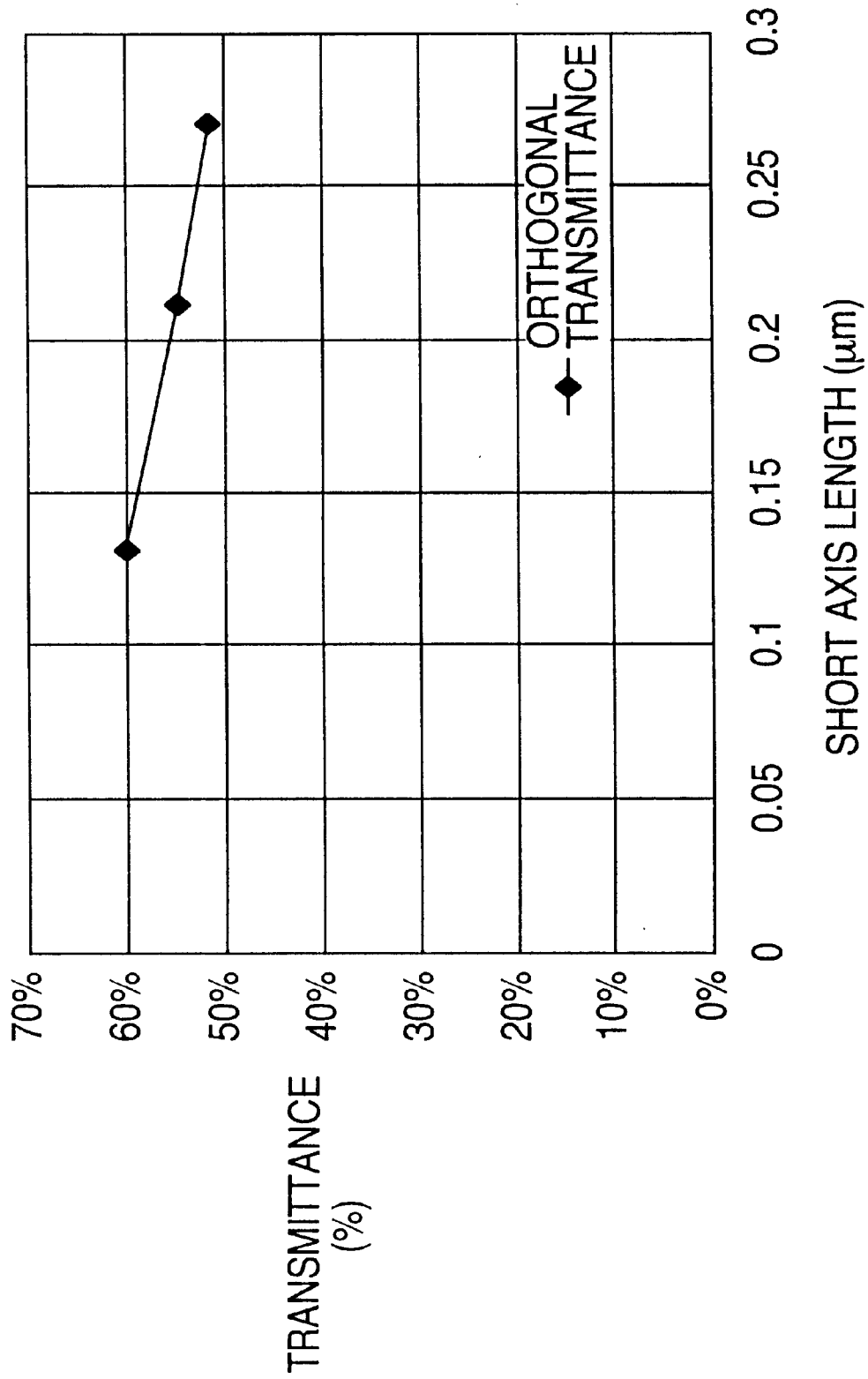

ANISOTROPIC SCATTERING DEVICE AND ITS USE

BACKGROUND OF THE INVENTION

1. Field of the Invention

The present invention relates to an anisotropic scattering device, and a liquid crystal display wherein back light can be effectively used.

2. Prior Art

Heretofore, the brightness of a liquid crystal panel has been reduced to half or less because the liquid crystal panel has a polarizing plate. Actually, since two polarizing plates are used on the surface and the back surface of the liquid crystal panel, the brightness of the plate has been reduced to 30 to 40% of the original brightness. In order to obtain a liquid crystal panel having higher luminance, some attempts of carrying out polarization conversion to compensate for these drawbacks have been made and are as follows.

(1) A method by means of a polarized beam splitter (hereinafter abbreviated to "PBS") (reference; ASIA DISPLAY'95, page 731);

(2) A method by means of cholesteric polarization conversion (reference; ASIA DISPLAY'95, page 735); and (3) A method using a composite of a liquid crystal and a polymer (reference; Japanese Patent Application No. 6-208319).

However, in the aforementioned methods, the following problems arise.

(1) In the method by means of a prism, when light from a light source is parallel light, a loss is small. On the other hand, when the light has an angle, the polarization conversion efficiency is deteriorated. Therefore, an angle dependency or a wavelength dependency can cause a problem. Furthermore, since the prism is used, there arises a problem that the light weight and the compact size are insufficient.

(2) When a cholesteric film is used, there arises a problem that a cholesteric spiral pitch must have a definite distribution so as to cover the whole wavelength range, and a very complicated method for production is required.

(3) When the composite of the liquid crystal and the polymer is used, the refractive index of the composite is limited by the liquid crystal material. Consequently, there arises a problem that large anisotropic scattering cannot be obtained and, therefore, the large polarization conversion efficiency cannot be obtained. In the production, a technique such as phase separation, etc. is required so that the method becomes complicated.

SUMMARY OF THE INVENTION

The present inventors have intensively studied the above problems. As a result, it has been found that, when a scattering particle having an aspect ratio of not less than 1 is fixed, by dispersing, in a light transmitting matrix medium having a refractive index which is different from that of the scattering particle, followed by arranging in approximately one direction, a device exhibiting an anisotropic scattering function is obtained, and that remarkably higher luminance by means of a back light of the liquid crystal panel is realized when the polarization conversion is carried out by using the anisotropic scattering device.

Accordingly, an object of the invention is to provide an anisotropic scattering device comprising a scattering particle having an aspect ratio of not less than 1 and a supporting medium having a different refractive index, the scattering particle being dispersed and arranged in the supporting medium.

It is preferred that the aforementioned scattering device has an anisotropy to a polarized light in a short axial direction and a long axial direction.

It is also preferred that the short axis length of the aforementioned scattering particle is within a Rayleigh scattering region while the long axis length is within a Mie scattering region or a geometric scattering region and has an anisotropy to a polarizing component of the polarized light.

It is preferred that the short axis length of the aforementioned scattering particle is shorter than a wavelength of light to be used in view of anisotropy scattering.

The scattering particle may be selected from a group consisting of titanium oxide, zirconium oxide, zinc oxide, silicone carbide, silicon nitride, silicon carbide, aluminum borate and glass, as the scattering particle.

On the other hand, it is preferred that the aforementioned supporting medium has a light-transmitting property in view of the loss of light. Furthermore, it is preferred that the medium is a resin material or a polymer material in view of arrangement by means of stretching, and lightening. It is particularly preferred that the aforementioned supporting medium is a liquid crystal because a freedom degree of arrangement can be increased by dispersing and arranging the supporting medium in the liquid crystal. It is preferred that, after arranging in the liquid crystal, a polymerizable material which has previously been mixed in the liquid crystal (or liquid crystal itself) is polymerized by means of light or heat, thereby fixing the scattering particle in the supporting medium, considering a difference in specific weight.

Incidentally, when a difference in refractive index between the aforementioned scattering particle and the supporting medium is not less than 0.05, the volume fraction of the aforementioned scattering particle in the aforementioned supporting medium is not less than 3%, and the thickness of the device is not less than 3 $\mu$m, and the number of the scattering particle arranged in a thickness direction is not less than 3, the anisotropic scattering device can be formed. However, it is possible to form the anisotropic scattering device based on backward scattering or the anisotropic scattering device based on forward scattering by adjusting a difference in refractive index between the scattering particle and the supporting medium or the density of the scattering particle in the supporting medium.

Another object of the present invention is to provide a liquid crystal display using the aforementioned anisotropic scattering device. One liquid crystal display is obtained by using the anisotropic scattering device based on backward scattering, and the liquid crystal display comprises a liquid crystal panel having a polarizing plate on a front surface side thereof; a back light device located on a back surface side of the liquid crystal panel; an anisotropic scattering device based on backward scattering, located between the liquid crystal panel and the back light device, the anisotropic scattering device comprising a scattering particle having an aspect ratio of not less than 1 and a supporting medium having a different refractive index, the scattering particle being dispersed and arranged in the supporting medium; and a reflecting plate or a scattering plate on the back surface of the back light device; wherein a scattering direction of the anisotropic scattering device is allowed to approximately coincide with a polarizing axis or an absorbing axis of the liquid crystal device.

It is preferred that a phase contrast plate, particularly ¼ wavelength plate, is provided between the aforementioned anisotropic scattering device and the reflecting plate or the scattering plate.

Typical examples of the back light device used include a side type back light device for illuminating from a light source through a light introducing plate, and a direct-under type back light device.

Furthermore, the present invention provides a reflection type liquid crystal display using the scattering anisotropic scattering device based on forward scattering, and the liquid crystal display comprises a liquid crystal panel; a reflecting plate located on a back surface side of the liquid crystal panel; and an anisotropic scattering device located on a surface side of the liquid crystal panel, the anisotropic scattering device comprising a scattering particle having an aspect ratio of not less than 1 and a supporting medium having a different refractive index, the scattering particle being dispersed and arranged in the supporting medium so as to obtain forward scattering; wherein external light is allowed to be incident on the anisotropic scattering device before the external light is allowed to be incident on the liquid crystal panel.

According to the present invention, the loss resulting from the angle dependency is small because the anisotropic scattering device is used. Furthermore, since no complicated process for production is used, the anisotropic scattering device can be simply produced. In order to increase the efficiency, it is preferred to arrange a particle of a material having a large refractive index (larger scattering) as the anisotropic scattering device in case of using backward scattering. Furthermore, the polarization conversion efficiency is improved by also using a phase contrast plate.

In order to improve the angle dependency, it is preferred that the arrangement of the anisotropic scattering particle has a twisted structure.

BRIEF DESCRIPTION OF THE DRAWINGS

FIGS. 7A and 7B are a schematic view showing a principle of a shear stress for arranging the particle according to the present invention.

FIG. 9 is a graph showing a relation between the kind of titanium oxide and the transmittance according to an embodiment of the present invention.

FIG. 10 is a graph showing a relation between the short axis length of the kind of titanium oxide and the transmittance according to the embodiment of the present invention.

DETAILED DESCRIPTION OF EMBODIMENTS OF THE INVENTION

Embodiments of the present invention will be explained hereinafter with reference to the accompanying drawings.

In the beginning, a relation between particles and scattering is classified largely into the following three cases due to a relation between a particle diameter (d) and a wavelength of light ($\lambda$).

(1) Geometric optical region ($d \gg \lambda$)

In this region, since scattering of light is caused by the reflection at the particle surface, a scattering capability of light increases with the increase of a specific surface area of the particle. Accordingly, a scattering capability S is proportional to a reciprocal of the particle diameter d.

$$S \propto 1/d$$

Therefore, the degree of scattering increases in inverse proportion to the particle diameter.

(2) Mie scattering region ($d \sim \lambda$)

In the region where the particle diameter and the wavelength of light are almost the same level, an expression of Mie scattering is established. Scattering of the present invention approximately corresponds to this region.

$$S \sim d^2 \pi \cdot K/4 \text{ (K is a constant)}$$

In the case of Mie scattering, the particle diameter at which the degree of light scattering reaches maximum depends on the refractive index, but it is considered that, in case of titanium oxide, the degree of scattering reaches maximum when d is $\lambda/2$.

(For detail, see ISHIHARA TIPAQUE NEWS published by Ishihara Sangyo Co., Ltd., "Regarding T100 ultra-fine titanium oxide", P. Stamatakis et.al., J. Coatings Tech., 62(10), 951(1990)).

(3) Rayleigh scattering region (d<<λ)

In this region, the total scattering performance is represented by the following Rayleigh's expression:

$$S \; d^6/\lambda^4$$

(For detail, see "Powders" written by Kiichiro Kubo et al., Maruzen (1985), page 177).

Consequently, in this region, the scattering capability S rapidly decreases in proportion to the sixth square of d.

Figure 4:
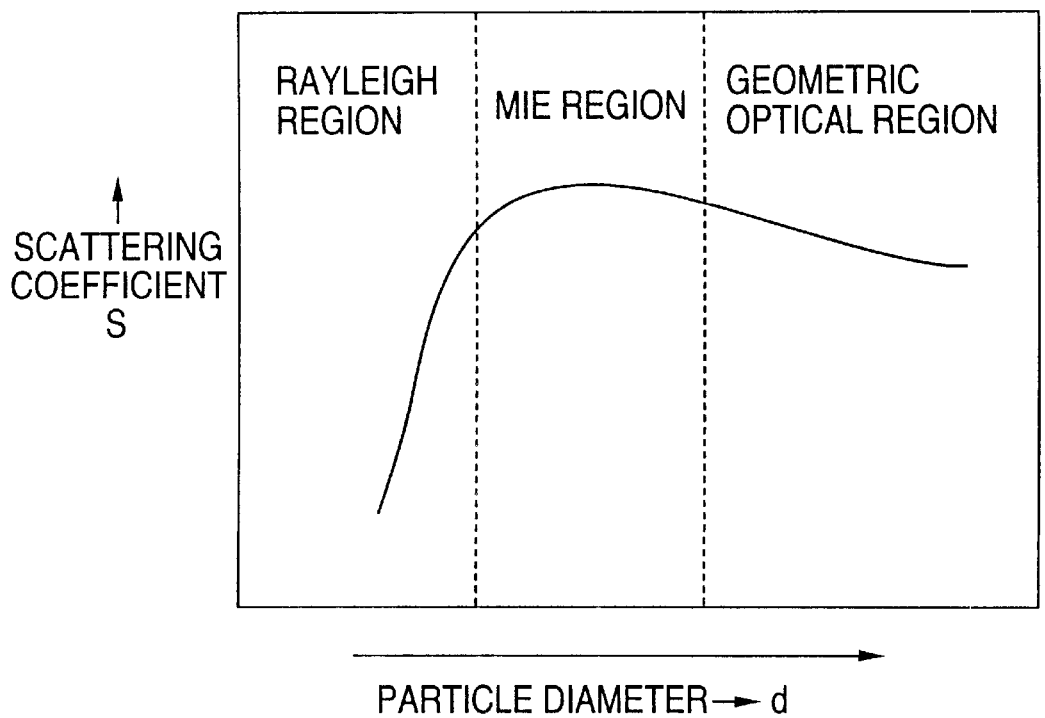
FIG. 4 is a view showing a relation between the general scattering and the particle diameter.

A relation between scattering and the particle diameter is shown in FIG. 4.

FIG. 4 shows the relation between the aforementioned scattering and the particle diameter.

As is apparent from FIG. 4, a scattering coefficient S rapidly decrease with the decrease of the particle diameter (Rayleigh scattering region).

The aforementioned regions are largely affected by not only the diameter (d) of the particle but also the difference in refractive index. Generally, the larger the difference in refractive index, the easier it becomes to enter the Mie scattering region even if the wavelength is small in comparison with the particle diameter.

Accordingly, the action of the present invention can be explained in the following way.

Figure 1A:
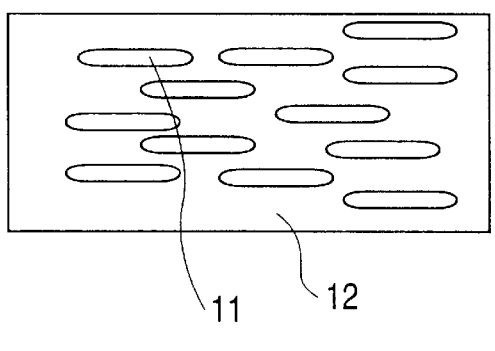
FIGS. 1A and 1B are a schematic view showing a structure of the anisotropic scattering device according to the present invention.
Figure 1B:
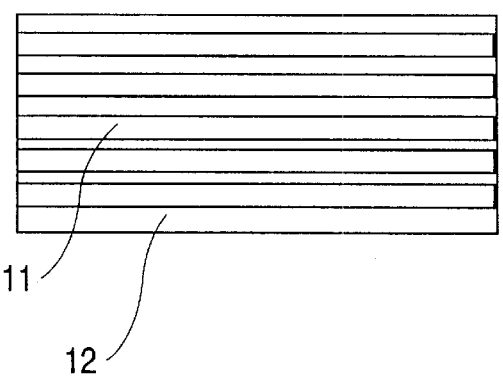

A structure of the anisotropic scattering device according to the present invention is shown in FIGS. 1A and 1B.

Figure 11:
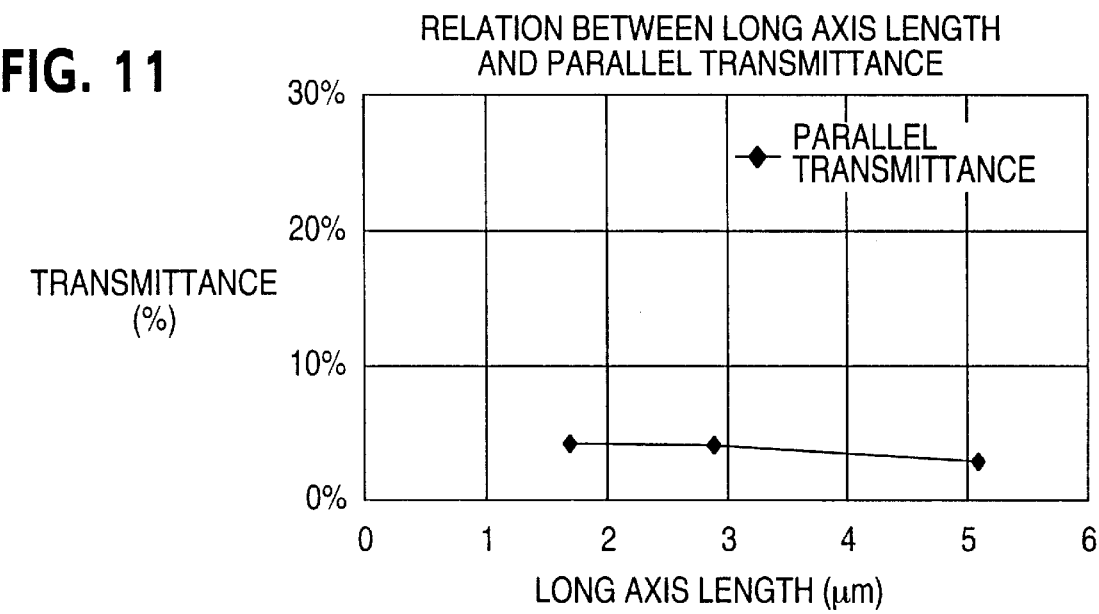
FIG. 11 is a graph showing a relation between the long axis length of the kind of titanium oxide and the transmittance according to the embodiment of the present invention.

In FIGS. 1A and 1B, 11 denotes a particle having a different aspect ratio, and 12 is a medium having a different refractive index. In FIG. 1A, particles have a rod-like shape or a rugby ball-like shape, but may have a layered shape as shown in FIG. 1B. Even in case of the layered shape, the aspect ratio may be different. In both FIGS. 1A and B, although the particles are arranged, they may not be oriented in one direction, completely, or a slight scatter may be present.

Figure 3:
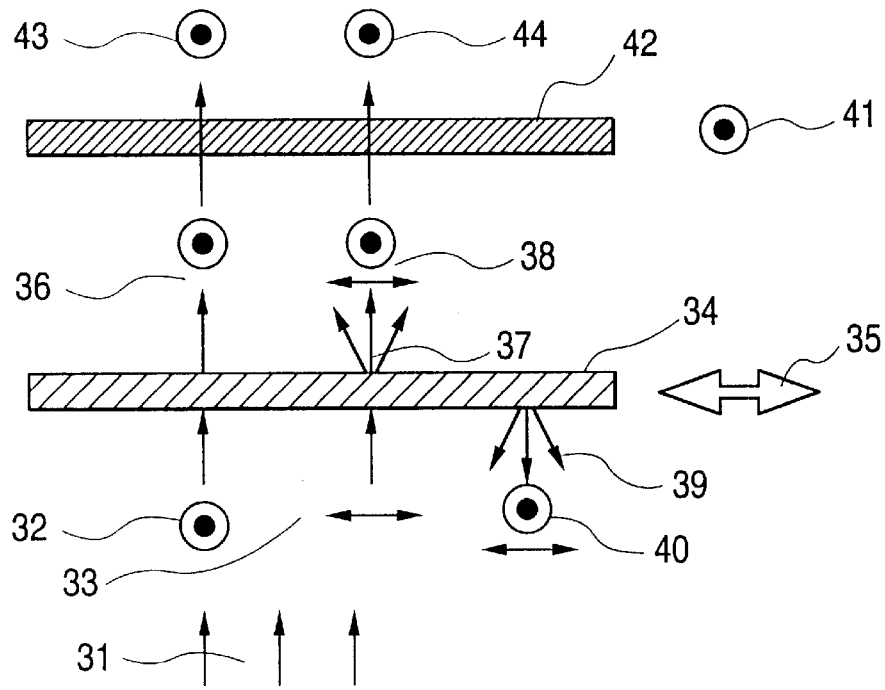
FIG. 3 is a principle view showing a polarization conversion mechanism according to the present invention.

In FIG. 3, a principle of carrying out polarization conversion will be explained by using a device having such a structure. In FIG. 3, it is considered that light 31 from a light source comprises polarized light 32 in a direction perpendicular to a paper surface, and polarized light 33 in a direction horizontal to the paper surface. With respect to an anisotropic scattering device 34, there is considered a case of having a long axial direction 35 in a horizontal direction. Since the polarized light 32 in a direction perpendicular to the paper surface goes straight in a short axial direction of an anisotropic scattering plate, it becomes a Rayleigh scattering region shown in FIG. 4 in case of the region where the short axis length of the particle is sufficiently shorter than the wavelength, and light is not scattered and goes as it is to form polarized light 36 after passing through the anisotropic scattering plate 34. On the other hand, since the other polarized light 33 from the light source goes in a long axis direction 35 of the anisotropic scattering device 34, scattering light 37 or 39 is formed when the relation between the wavelength and the long axis length of the particle becomes a scattering region where the degree of scattering of FIG. 4 becomes large (Mie scattering region and geometric optical scattering region) over the Rayleigh scattering region closed to the Mie scattering region.

The scattering light of the polarized light 33 can be classified into the following two cases.

(1) When the difference in refractive index (Δn) is not so large, or when the density of the scattering particle is small (for example, when the thickness of the anisotropic scattering surface device is small and the volume % is small), forward scattering is exclusively carried out. This reason is as follows. That is, since the scattering capability is small, forward scattering light 37 is formed.

Furthermore, the scattered light 37 generally does not maintain a polarized state so that there is provided a state in which the polarized light in a direction perpendicular to the paper surface and the polarized light horizontal to the paper surface is mixed.

Furthermore, when the scattering capability of the anisotropic scattering plate is weak, scattering tends to become weak and the polarizing component tends to be kept.

(2) When the difference in refractive index (Δn) is large, or when the number of scattering particles is large to a direction of light transmission (for example, the thickness of the anisotropic scattering device is large or when the volume % to the medium of the particle is large), backward scattering arises.

Figure 5:
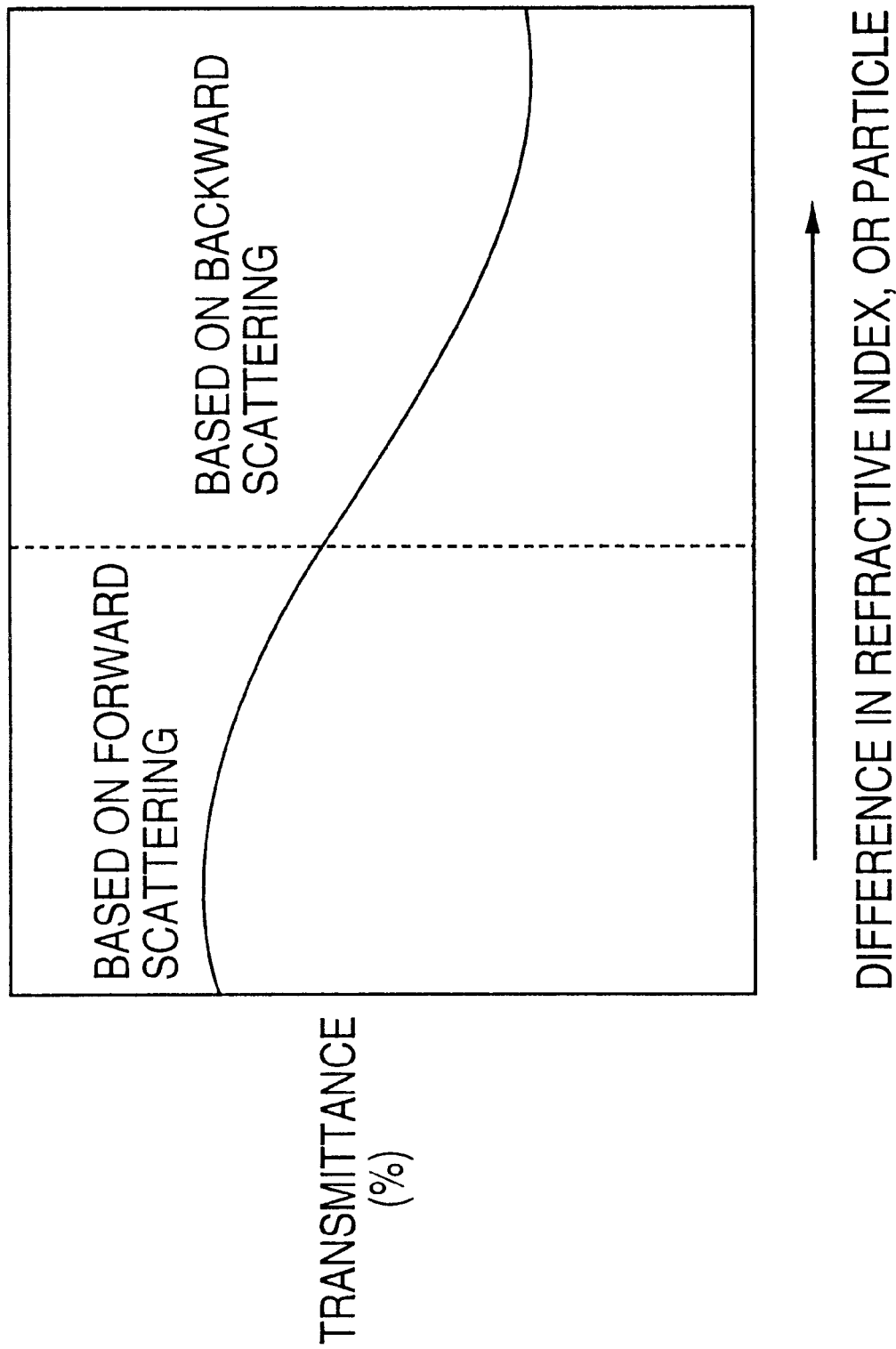
FIG. 5 is a view showing a region where general forward scattering and general backward scattering arise.

In this case, the polarized light 33 does not pass through the anisotropic scattering device 34 and is converted into scattering light which returns in a backward direction. Also, in this case, the polarizing component is not kept and light mixed with polarized light 40 is formed. In case of scattering, as shown in FIG. 5, when the axis of abscissa represents the difference in refractive index or the number of scattering particles, and the axis of ordinate represents the transmittance (whole light bundle) of the scattering light, the transmittance does not virtually change because the first region is based on forward scattering. Therefore, when the difference in refractive index or the number of scattering particles increases, backward scattering arises so that light is scattering backward and the transmittance decreases.

Also, in case of the anisotropic scattering device of the present invention, it is considered that the polarized light in the scattering direction causes the same phenomenon of the transmittance as that in FIG. 5.

Figure 6:
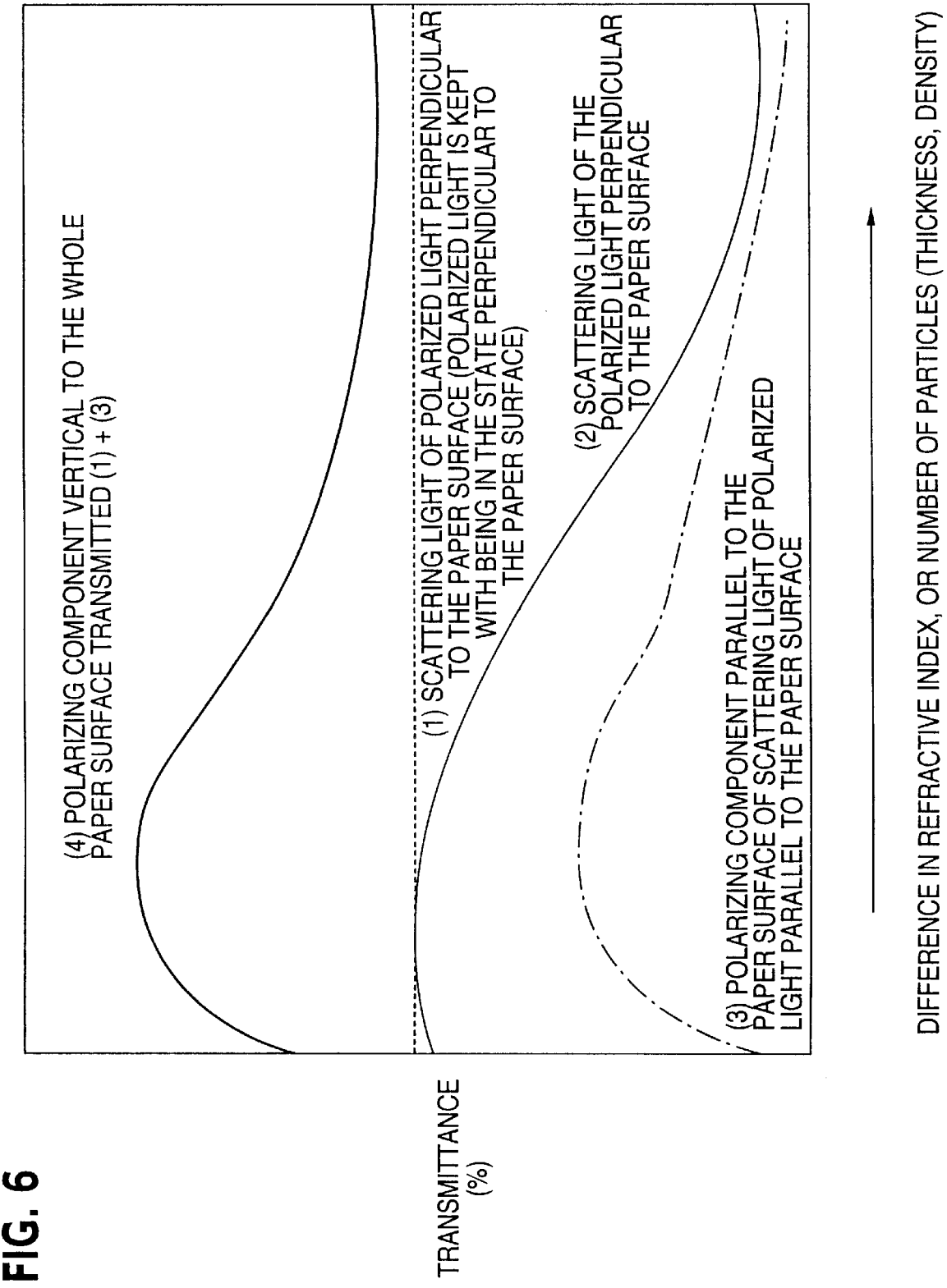
FIG. 6 is a view showing a relation between the difference in refractive index and the transmittance in anisotropic scattering of the present invention.

The aforementioned effect will be explained in detail with reference to FIG. 6. In FIG. 6, it is assumed that the arrangements of the anisotropic scattering device and polarized light are the same as those in FIG. 3. At this time, the polarized light (1) (denoted by a dotted line) perpendicular to the paper surface passes through while the perpendicular polarizing component is approximately kept. As long as the short axis direction is sufficiently shorter than the wavelength of light, the polarizing component will be kept even when of the axis of abscissa increases.

Regarding the scattering light (2) (denoted by a solid line) of the polarized light parallel to the paper surface, the degree of backward scattering increases and the transmittance is lowered with the increase of the axis of abscissa in the same manner as FIG. 9.

Regarding the polarizing component (3) (denoted by an alternate long and short dash line) of the scattering light, which is perpendicular to the paper surface, the transmittance is small at the part where the axis of abscissa is small because the polarizing component is kept when the scattering capability is weak, as described above. As the axis of abscissa goes to the right, the polarizing increases with an increase in the scattering. It is thought that when the scattering becomes much stronger, the backward scattering is generated so that the polarizing component becomes small in the same manner as (2).

In the end, the polarizing component (4) (denoted by a thick solid line) becomes a component of (1)+(3) with the result that a curve shown in (4) is provided.

As described above, in the anisotropic scattering device according to the present invention, light that has passed through the device is allowed to pass while keeping the polarized light on one side. The polarized light on the other side is scattered and the polarized light state can be changed. That is, the polarized light can be added to the original polarized light 32. This can be easily understood from the fact that the polarized light perpendicular to the paper surface is generated in one part of 38 in addition to 36 in case of forward scattering 37 shown in FIG. 3.

Furthermore, as shown in FIG. 3, when the polarizing device 42 (polarizing plate) is provided and the polarizing axis 41 is set in a direction perpendicular to the paper surface (the polarized light of the polarizing device (the polarizing axis of the polarized light device agrees with the light transmission axis (a short axis direction) of the anisotropic scattering device), the transmitted light 36 passes through the polarizing device without causing damage to the device with the result that light 43 is generated. Furthermore, the scattered light 37 has both polarizing components, but the polarized light in a direction parallel to the paper surface is cut in the polarizing device 42 so that only the polarized light perpendicular to the paper surface can remain. In such way, by using the polarizing device, only one polarized light can be effectively extracted.

Furthermore, as used in combination with the polarizing device, the light transmission light 36 shown in FIG. 3 sometimes has a small amount of polarizing component parallel to the surface of the paper, in addition to the polarizing component perpendicular to the paper surface. Thus, the combination is important in the sense that the purity of the polarized light is increased.

In case of backward scattering 39 in FIG. 3, only the polarized light passes through 36 so that the polarized light does not ostensibly increases. However, the polarizing component can be increased by allowing the polarized light to be incident on the anisotropic scattering device again by providing the reflection plate at the back part of the light source.

Also, in this case, the same effect as described above can be expected by using the polarizing component.

A principle will be explained in detail in the case where the polarization conversion is carried out when backward scattering arises.

Figure 2:
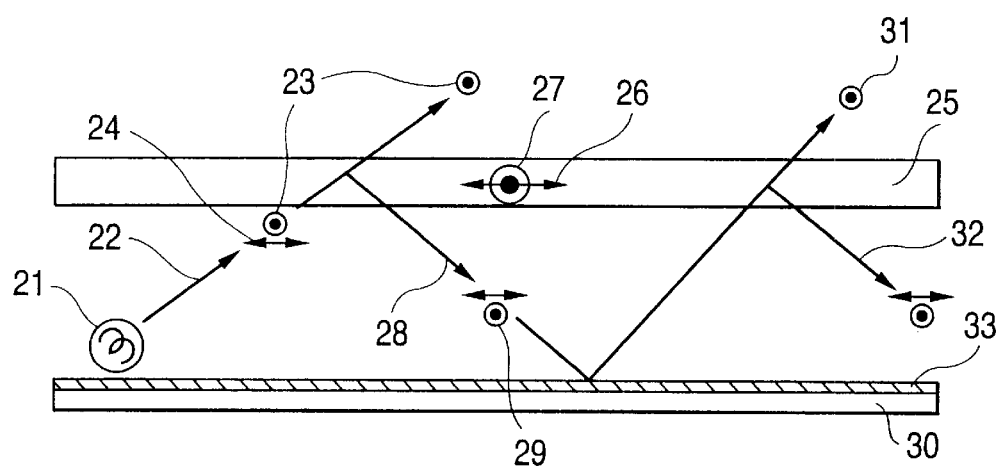
FIG. 2 is a principle view showing a polarization conversion mechanism showing an action at the time of backward scattering according to the present invention.

FIG. 2 is a principle view in which there is presumed an edge light type back light on which light from the light source is incident in a diagonal direction. In FIG. 2, light 22 emitted from the light source 21 has both polarizing components 23 and 24 as the polarizing component thereof. At this time, both polarizing components 23 and 24 have a direction of polarized light, and they intersect perpendicularly to each other. 25 denotes an anisotropic scattering device, and 26 denotes a polarizing component. 27 denotes a direction of the polarizing component which is not scattered (hereinafter referred to as a scattering light axis and a light transmission axis, respectively).

As is explained in FIG. 3, the polarizing component 23 which is horizontal to the light transmission axis is not affected by the scattering and transmits light. The polarizing component 24 which is horizontal to the scattering light axis 24 is scattering. At this time, when scattering particles having a large refractive index are used, backward scattering 28 arises with the result that these polarizing components are scattering backward. The polarizing component which has been scattered in a backward direction is reflected, for example, by the reflection plate 30 in the back light to be brought back to the anisotropic scattered device 25 again. The scattered polarizing component 29 normally does not have the original polarization state. Consequently, since the scattered polarizing component 29 has a polarizing component which is horizontal to the light transmission axis of the anisotropic scattering device with the result that the polarizing component is separated again into the polarized light which is transmitted and the polarized light which is sub-jected to the backward scattering. With the repetition of the aforementioned procedure, light 32 emitted from the light source 31 becomes a polarized light, which is in approximately unidirectional, so that light transmits the anisotropic scattering device and functions as the polarization conversion device. Consequently, the liquid crystal panel having a brightness two times stronger than the normal brightness can be obtained.

Furthermore, by disposing a phase contrast plate 33 on the reflection plate 30 so as to further raise the efficiency, the direction of the backward-scattered polarizing component can be changed and a more efficient polarization conversion device can be obtained. In particular, the ¼λ plate can change the polarization direction through 90 degrees. Thus the plate can be regarded as a phase difference plate which allows more efficient polarization conversion.

The anisotropic scattering device of the present invention does not have an anisotropy in the refractive index as can be seen in the liquid crystal, and is characterized by having the anisotropy in that the refractive index is the same but the aspect ratio is different. For example, in case of the titanium oxide having a rod-like shape, when the short axis direction is sufficiently smaller than the wavelength to be used, the degree of scattering is small so that light is transmitted. However, when the long axis is larger than the wavelength, there arises a phenomenon in which only unidirectional polarized light is transmitted. Regarding this phenomenon, in case of the structure wherein anisotropic scattering devices are laminated in many layers, multiple scattering arises so that a larger advantage can be obtained.

An action of a method for producing the anisotropic scattering device will be explained hereinafter.

In order to produce the anisotropic scattering device, it is necessary to use an anisotropic scattering particle (material having a large refractive index, such as titanium oxide, zirconium oxide, zinc oxide, silicone carbide, silicon nitride, silicon carbide, aluminum borate, glass, etc. are preferred). The anisotropic scattering device can be produced by arranging these particles in one direction. Furthermore, since these particles have an anisotropy to the polarizing component, the rod-like shape is preferred. Furthermore, a state wherein many layers are laminated with each other in a light transmission direction in order to improve the scattering characteristic is preferred. Furthermore, in order to make the scattering anisotropy effective, the transmittance becomes higher and the polarized light keeping property is good as the length of the transmission axis direction is shorter to the wavelength of light.

In order to arrange the anisotropic scattering particles in one direction, there can be used an arranging method of scattering the particles in the supporting medium (whose refractive index is smaller than that of the anisotropic scattering particle), followed by stretching. It is possible to say that the method is the simplest method. Furthermore, in case of a particle having a magnetic anisotropy or an electric field anisotropy, an arrangement can be obtained by fixing the particle in the supporting medium with applying an electric field or a magnetic field in one direction. Furthermore, it is possible to arrange particles having different aspect ratios by dispersing the particles in a flowable medium and applying a shear stress (shear) in one direction.

FIG. 7 is a principle view showing the aforementioned shear stress method. FIG. 7A is a view showing the anisotropic device as seen from an upper direction. Particles 71 in an approximately random state, which are dispersed in the medium sandwiched between substrates, are arranged 73 so as to alleviate the stress by an unidirectional shear stress 72.

FIG. 7B is a view of the anisotropic scattering device as seen from a thickness direction.

Figure 8A:
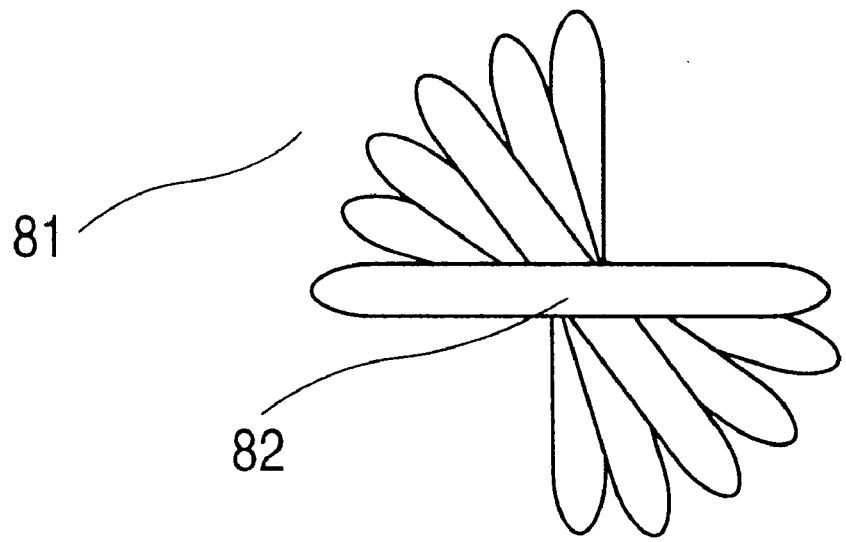
FIGS. 8A and 8B are a schematic view showing an anisotropic scattering device having a twisted structure according to the present invention.
Figure 8B:
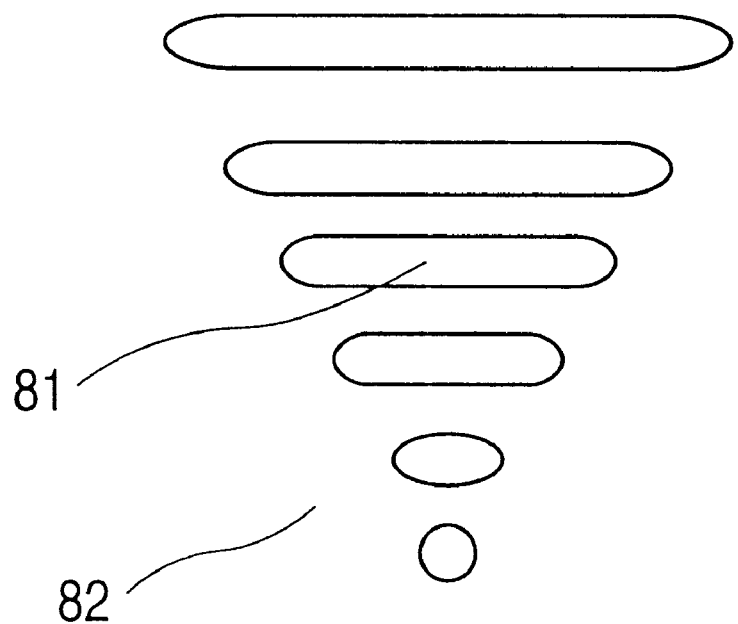

In the aforementioned method, only a unidirectionally arranged anisotropic scattering device can be produced, but any twisted structure can be obtained by mixing with the liquid crystal. In this case, the scattering component can be easily kept to a diagonal incident light so that the angle dependency becomes small. A schematic view showing the anisotropic scattering device in a twisted state is shown in FIG. 8. FIG. 8A is a view of the device as seen from the upper part. FIG. 8B is a view of the device as seen from the thickness direction. In FIG. 8, 81 denotes a medium and 82 denotes a particle.

BEST MODE FOR CARRYING OUT THE INVENTION

<Embodiment 1>

Hereinafter, one embodiment of the present invention will be explained in detail with reference to the accompanying drawing.

As the titanium oxide having a different aspect ratio, three kinds of titanium oxides were used (commercially available from Ishihara Sangyo Co., Ltd.). They are shown in Table 1 below.

TABLE 1

Rod-shaped titanium oxide used

|  | Titanium oxide (1) | Titanium oxide (2) | Titanium oxide (3) |
|---|---|---|---|
| Fiber length (average value) | 1.7 μm | 2.9 μm | 5.1 μm |
| Fiber diameter (average value) | 0.13 μm | 0.21 μm | 0.27 μm |

Three kinds of titanium oxides as a supporting base were mixed with a mixture of 2-ethylhexyl acrylate and an urethane oligomer (70:30 wt %) in a ratio of (three kinds of titanium oxides:polymer compound=2:1 (wt %). Then the mixture was kneaded by using a three-roller kneader to disperse the titanium oxides therein At this time, 2% by weight of benzophenone was added as a polymerization initiator. Examples of those having a large refractive index, in place of titanium oxide, include potassium titanate, silicon nitride (SiNx), silicon carbide (SiC), etc.

The aforementioned well-dispersed mixture was applied on a glass substrate, and then ultraviolet light was irradiated at an intensity of 20 mW/cm$^2$ (360 nm filter) for 2 minutes to cure the mixture, thereby producing a film-like resin mixture. At this time, a high pressure mercury vapor lamp was used as a lamp.

Regarding a thickness of the film, those having the thickness of about 3 μm to 100 μm were produced by adjusting the time after application. At this time, the refractive index of the medium was approximately 1.5. The aforementioned film was unidirectinally stretched at a stretching ratio of about two to three times. Due to the microscopic observation, three kinds of rod-shaped titanium oxides were approximately arranged in a stretching direction.

When the polarizing plate was rotated on the anisotropic scattering device thus produced as described above, the following results were obtained. That is, it was darkest when the polarizing axis and the scattering axis (stretching direction) agreed with each other while it was the brightest when the polarizing axis intersected perpendicularly to the scattering axis (agree with the transmission axis).

<Embodiment 2>

The transmittance of the anisotropic scattering device having a thickness of about 20 μm produced in Embodiment 1 was measured. At this time, the transmittance at the time when the polarizing axis was allowed to intersect perpendicularly to the scattering axis of the anisotropic scattering device by using nicole prism was defined as an orthogonal transmittance, and the transmittance at the time when the scattering axis was allowed to be parallel to the scattering axis of the anisotropic scattering device was defined as a parallel transmittance, and then both transmittances were measured. Furthermore, the transmittance of the polarizing device at the time when no scattering particle was added was measured as 50%. Furthermore, as a measuring method, the transmittance was measured by using an integrating sphere so as to collect the scattered light as much as possible. As the wavelength of light, visible light (having a wavelength of 400 nm to 800 nm) was used.

The results of the measurement of the transmittance of those produced in Embodiment 1, wherein three kinds of the titanium oxides have a thickness of about 20 μm, are shown in Table 2. FIG. 9 is a graph showing the results.

TABLE 2

Difference in transmittance with the kind of titanium oxide

|  | Titanium oxide (1) | Titanium oxide (2) | Titanium oxide (3) |
|---|---|---|---|
| Orthogonal transmittance (%) | 60% | 55% | 52% |
| Parallel transmittance (%) | 4% | 4% | 3% |

As is apparent from this graph, the orthogonal transmittance of titanium oxide (1) is higher than that of the titanium oxide (2) and that of titanium oxide (3), and the transmittance exceeded 50% of the transmittance in case of using only the polarizing device in all samples. The relation between the length of the short axis of respective titanium oxide and the orthogonal transmittance thereof while Table 4 described below and FIG. 8 shows the relation between the short axis length and the orthogonal transmittance of each titanium oxide is shown in the following Table 3 and FIG. 7.

TABLE 3

Relation between short axis length and orthogonal transmittance

|  | Length of short axis | Orthogonal transmittance |
|---|---|---|
| Titanium oxide (1) | 0.13 | 60% |
| Titanium oxide (2) | 0.21 | 55% |
| Titanium oxide (3) | 0.27 | 52% |

TABLE 4

Relation between long axis length and orthogonal transmittance

|  | Length of long axis | Parallel transmittance |
|---|---|---|
| Titanium oxide (1) | 1.7 | 4% |
| Titanium oxide (2) | 2.9 | 4% |
| Titanium oxide (3) | 5.1 | 3% |

As is apparent from these tables and figure, the orthogonal transmittance decreases with the increase of the short axis length. It is considered that this is caused by an influence that the short axis length comes close to the wavelength.

Furthermore, the influence on the long axis length was considerably small within this range (1.7 μm to 5.1 μm).

Figure 12:
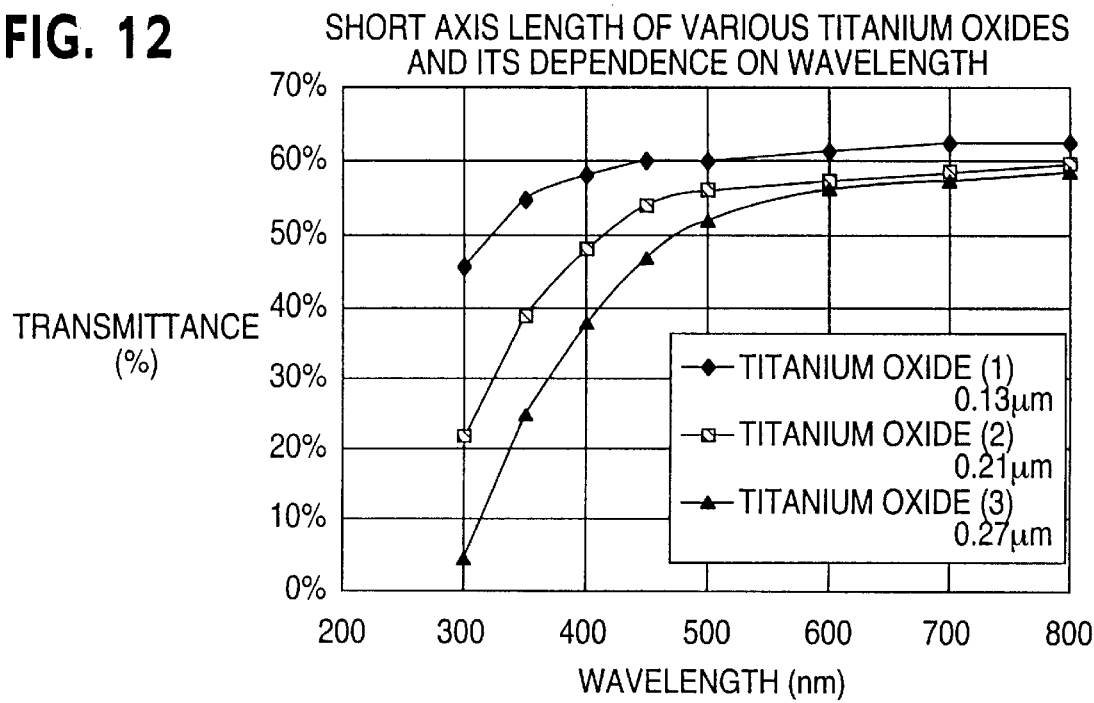
FIG. 12 is a graph showing a relation between the kind of titanium oxide and the wavelength dependency of the transmittance according to the embodiment of the present invention.

Next, the wavelength dependence of the orthogonal transmittance of these three kinds of anisotropic scattering devices was measured. The results are shown in FIG. 12. As is apparent from FIG. 12, the orthogonal transmittance decreases with the decrease of the wavelength. It is considered that this is because the wavelength comes near to the short axis length. With the increase of the short axis length, the orthogonal transmittance of the light having a short wavelength decreases drastically. Furthermore, the orthogonal transmittance drops on the long wavelength side. It is assumed that this is because the short axis length and the wavelength of the light comes near to each other as described above. Furthermore, it has been found that good results can be obtained when the length of the short axis is short compared to the wavelength of light to be used.

<Embodiment 3>

A dependency of the volume fraction of the titanium oxide (1) in the anisotropic scattering device produced in Embodiment 2 was studied. The production was conducted according to the same manner as that described in Embodiment 2. The thickness of the device was set to about 20 μm.

Figure 13:
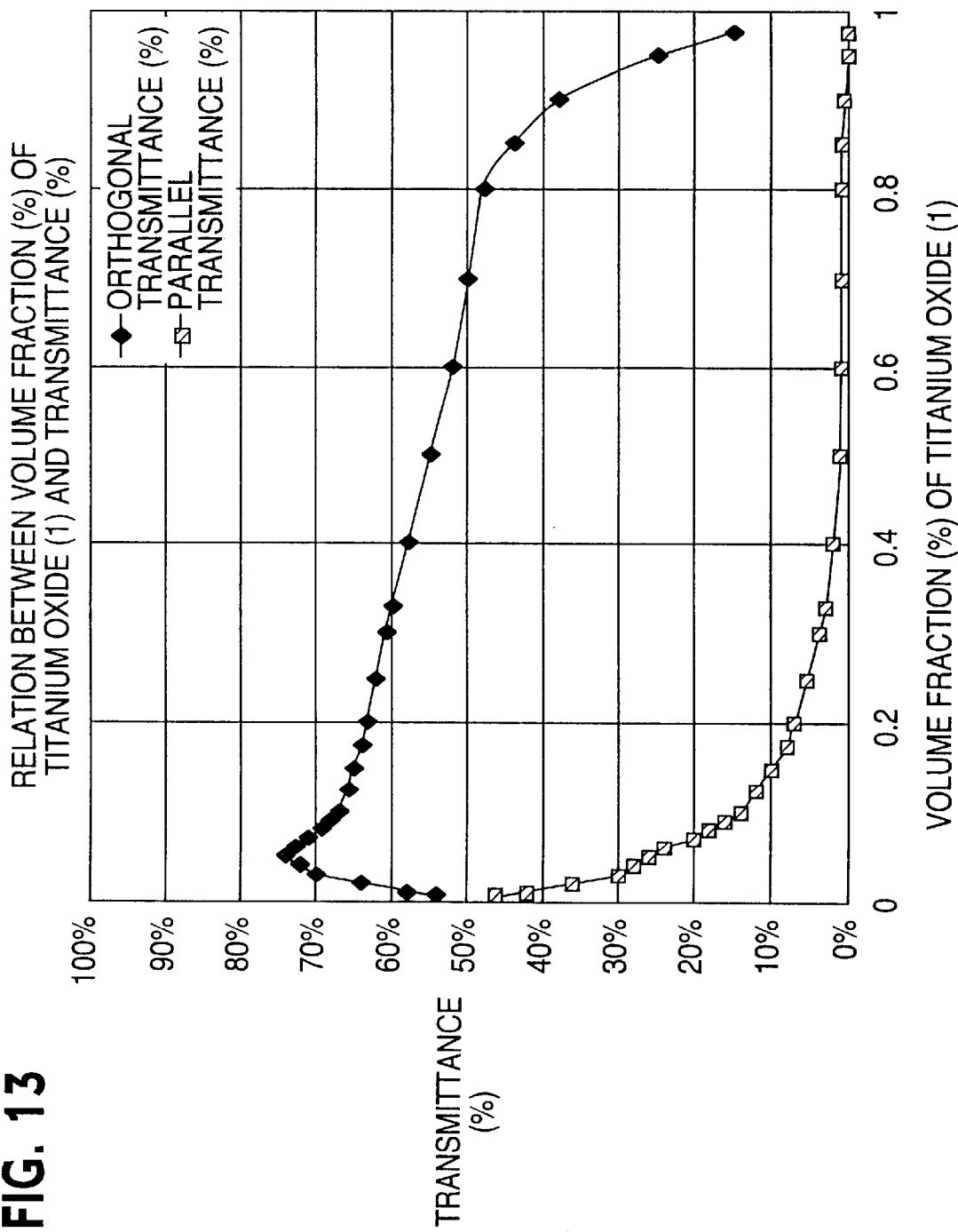
FIG. 13 is a graph showing a relation between the volume fraction of titanium oxide (1) and the transmittance according to the embodiment of the present invention.

The measuring results of the orthogonal and parallel transmittances are shown in FIG. 13.

As is apparent from FIG. 13, the orthogonal transmittance increases with the increase of the volume fraction of the titanium oxide (1) while the orthogonal transmittance decreases with the further increase of the volume fraction. On the other hand, it has been found that the average transmittance rapidly decrease with the increase of the volume fraction. It has been found that this approximately corresponds to FIG. 6. As a consequence, it has been found that when the titanium oxide has a thickness of 20 μm, anisotropic scattering arises at 0.5 volume % or more and the polarizing component increased and, furthermore, backward scattering arises at 3 volume % or more. This means that at this time, when the titanium oxide has a thickness of 20 μm at 0.5 volume % or more, about seven particles are present in a thickness direction with the result that the septuple scattering arises. Furthermore, about 40 particle layers are formed at 3 volume %. Furthermore, the orthogonal transmittance rapidly decreases at 80 volume % or more. It is considered that this is because the dispersion of the titanium oxide is not complete.

<Embodiment 4>

Figure 14:
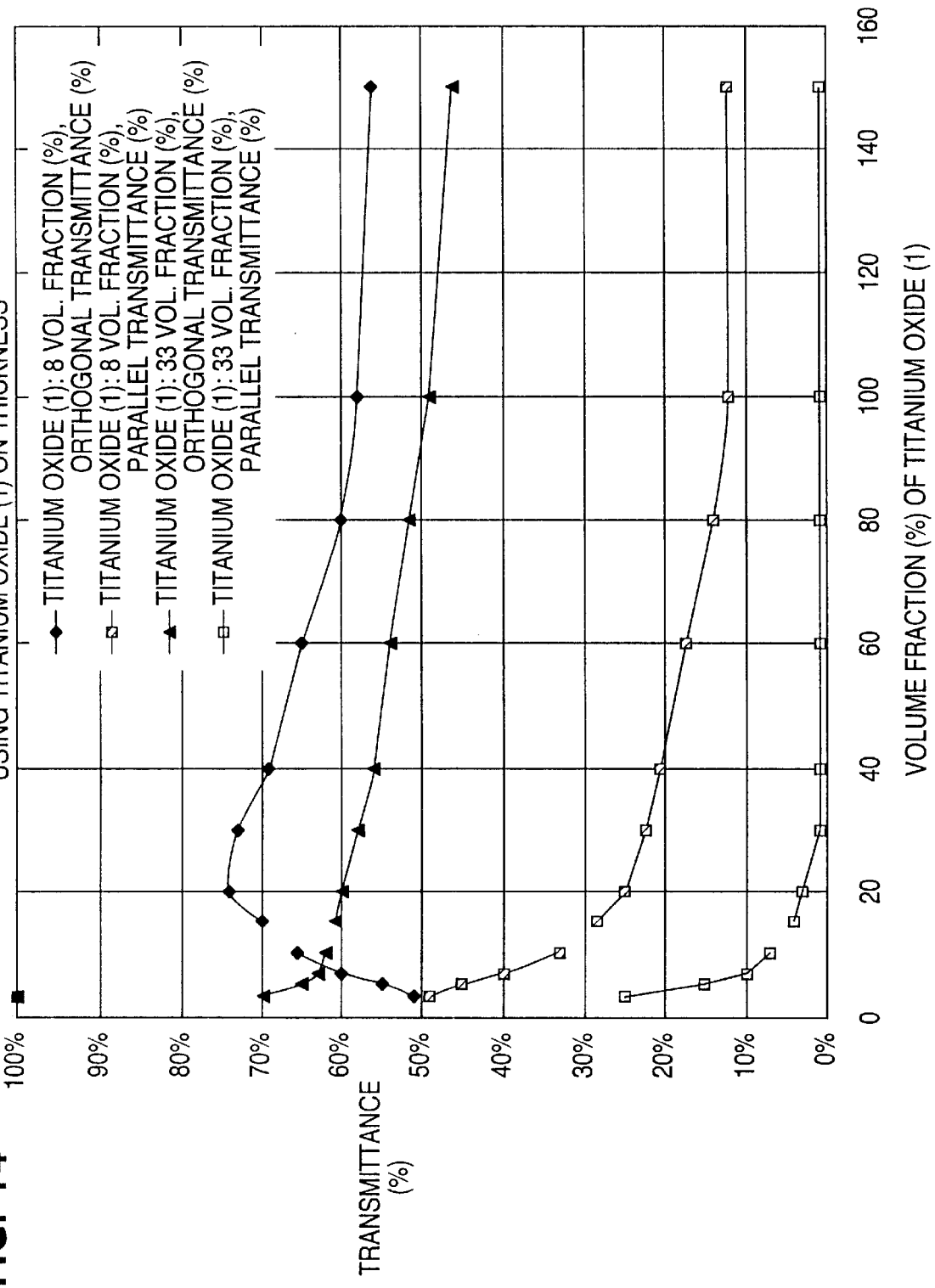
FIG. 14 is a graph showing a relation between the thickness of the anisotropic scattering device of titanium oxide and the transmittance according to the present invention.

The dependency of the titanium oxide (1) in the anisotropic scattering device produced in Embodiment 3 on the thickness was studied. The production was conducted according to the same manner as that described in Example 2. Regarding the volume % of the titanium oxide, 8 volume % and 33 volume % were respectively used (each corresponding to forward scattering and backward scattering.). The thickness was set to about 3 to 150 μm. The results are shown in FIG. 14.

In case of 8 volume %, it has been found that the anisotropic scattering effect arises at the orthogonal transmittance of about 5 μm while backward scattering arises at the orthogonal transmittance of not less than 16 μm. At this time, anisotropic scattering arises at about three layers (number of particles). It is considered that scattering becomes effective at three or more layers. Furthermore, it has been found that eight or more layers are required when backward scattering is used (assuming that the layers are arranged in an ideal manner). On the other hand, it has been found that backward scattering arises even at the thickness of about 3 μm in case of 33 volume %.

<Embodiment 5>

Next, with respect to other anisotropic scattering materials, an anisotropic scattering device was produced according to the same manner as that described in Embodiment 1. Particles used are shown in Table 5. Glass fibers were commercially available from Coning Co. Ltd., Nippon Electric Glass Co. Ltd., Motoyama Co., Ltd and the like. Silicon carbide and silicon nitride were commercially available from High Purity Chemical Co., Ltd., and aluminum borate was commercially available from Okada Chemical Co., Ltd.

TABLE 5

Table of characteristics of various materials

| Quality of particles | Refractive index | Short axis length (μm) | Long axis length (μm) | Difference in refractive index (Δn) |
|---|---|---|---|---|
| Glass fiber (1) | 1.78 | 0.1 | 20 | 0.28 |
| Glass fiber (2) | 1.56 | 0.2 | 25 | 0.06 |
| Glass fiber (3) | 1.56 | 0.5 | 20 | 0.06 |
| Aluminum borate | 1.63 | 0.3 | 5 | 0.13 |
| Silicon carbide | 2.65 | 0.2 | 5.6 | 1.65 |
| Silicon nitride | 2.00 | 0.2 | 2.6 | 0.5 |

Figure 15:
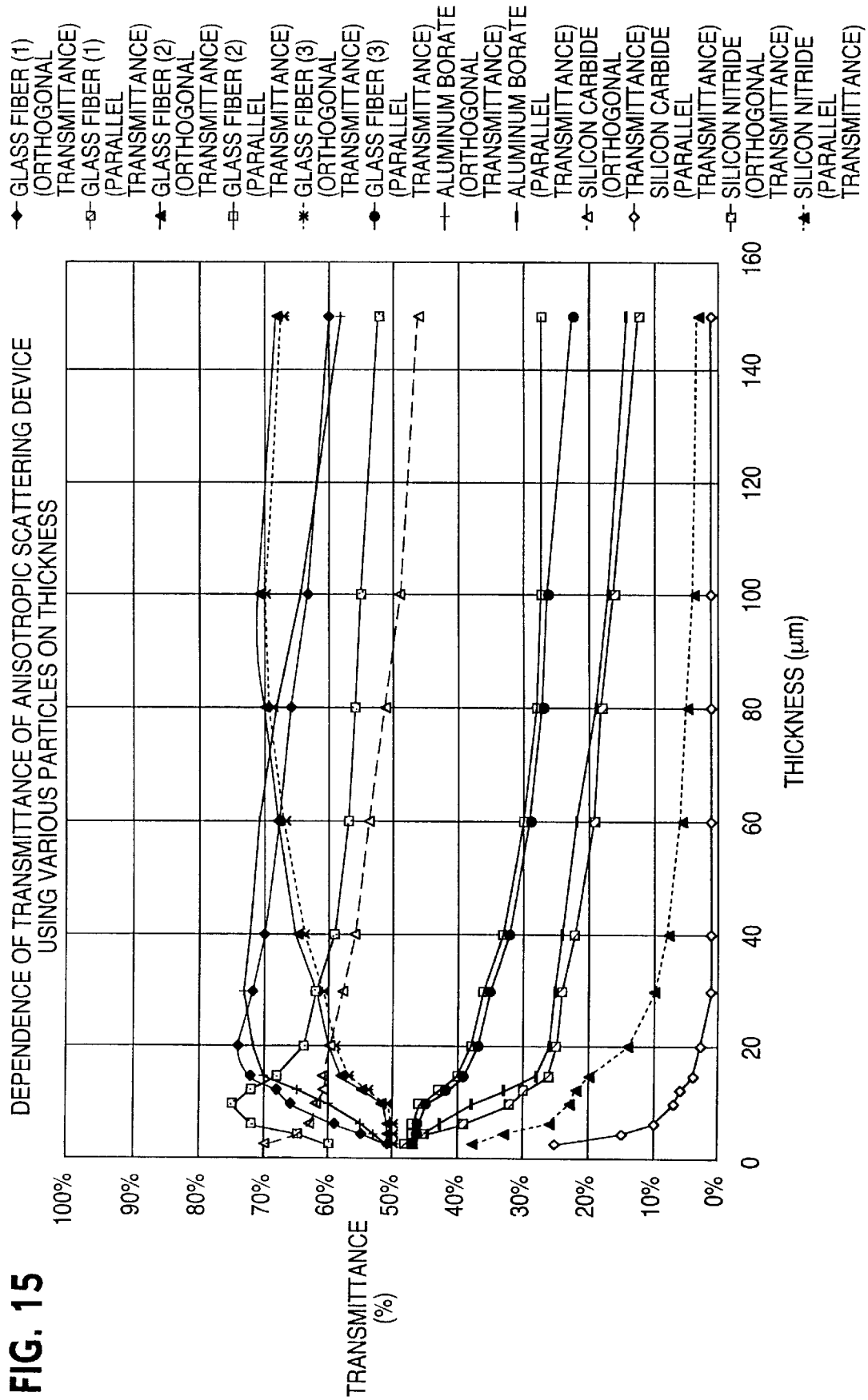
FIG. 15 is a graph showing a transmittance of the anisotropic scattering device using various particles and a thickness of the device according to the embodiment of the present invention.

By using materials in Table 5 in a volume % of 35%, an anisotropic scattering device was produced by varying the thickness according to the same manner as that described in Example 4. The measuring results of the orthogonal transmittance and parallel transmittance are shown in FIG. 15. As is apparent from FIG. 15, the thickness at which forward scattering became maximum (in other words, the thickness at which backward scattering starts) becomes smaller with the increase of the difference in refractive index, and the thickness at which forward scattering became maximum becomes larger with the increase of the difference in refractive index.

Figure 16:
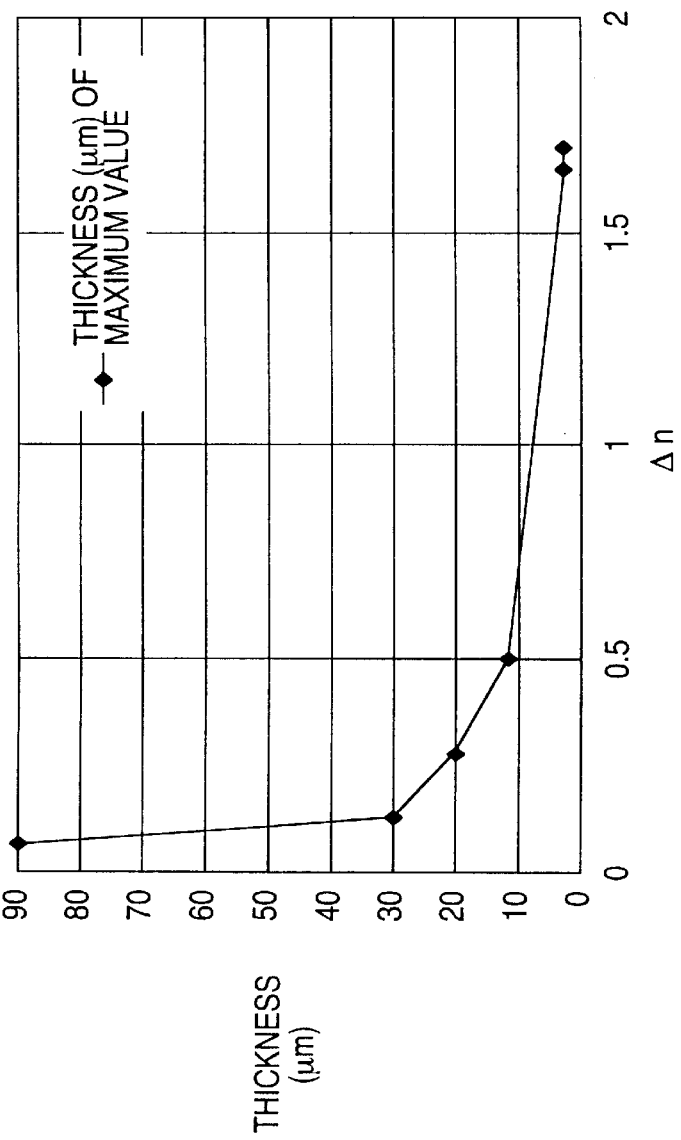
FIG. 16 is a graph showing a relation between n and the maximum value of the transmittance according to the embodiment of the present invention.
Figure 17:
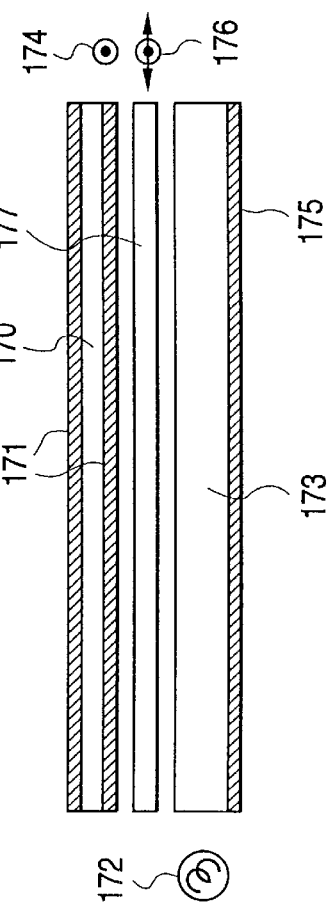
FIG. 17 is a schematic view showing a side type back light or a liquid crystal panel according to the embodiment of the present invention.

The relation between the thickness, at which the orthogonal transmittance becomes the maximum value, and the difference in refractive index is shown in Table 6 and FIG. 16.

TABLE 6

Difference in refractive index of various materials and thickness at maximum value of orthogonal transmittance

| Material particles | Refractive index | Difference in refractive index (Δn) | Thickness of maximum value (μm) |
|---|---|---|---|
| Glass fiber (1) | 1.78 | 0.28 | ~20 |
| Glass fiber (2) | 1.56 | 0.06 | ~90 |
| Glass fiber (3) | 1.56 | 0.06 | ~90 |
| Aluminum borate | 1.63 | 0.13 | ~30 |
| Silicon carbide | 2.65 | 1.65 | >3 |
| Silicon nitride | 2.00 | 0.5 | ~12 |
| Titanium oxide | 2.7 | 1.7 | ~3 |

As is apparent from FIG. 16, anisotropic scattering arises if only the refractive index is not less than 0.05 and the thickness is large. Furthermore, as is apparent from FIG. 15 and FIG. 16, backward scattering arises efficiently when the difference in refractive index is not less than 0.13, preferably not less than 0.28. It is possible to say that these effects are the same even when not only the film thickness but also the volume % of the particles are changed.

As is apparent from FIG. 15, when the difference in refractive index is small, no large influence is exerted even if the short axis is larger than the wavelength, e.g. 0.5 μm (500 nm). At this time, since the difference in refractive index is small, scattering was not effective. It is considered to be necessary that the length of the short axis is preferably smaller than the wavelength.

<Embodiment 6>

As the arranging method, a method using a shear stress will be explained below.

Using titanium oxide (1) as the particle, a composite of the titanium oxide and the resin was produced according to the same manner as that described in Embodiment 1. Before curing the composite by ultraviolet light, a spacer (manufactured by Sekisui Fine Chemical Co., Ltd.) having a thickness of 20 μm was mixed with 0.5% by weight of the resin. Then, the mixture was dropped on a glass substrate and sandwiched using the other glass substrate. The upper glass substrate was subjected to shearing in one direction by using a micrometer under the conditions of a width of 20 μm and a revolution of 60 times/minute. It has been found by microscopic observation that arrangement is carried out in the same manner as stretching.

<Embodiment 7>

The back light and the liquid crystal panel according to one embodiment of the present invention will be explained hereinafter Three kinds of anisotropic scattering devices 177 produced in Embodiment 1 were disposed between a liquid crystal panel 170 provided with a polarizing plate 171 on both sides and a light introducing plate 173 of a side light type back light 172. At this time, the anisotropic scattering device 177 was disposed so that a light transmission axis 176 of the anisotropic scattering device 177 agrees with a polarizing axis 174 of the back light side of the liquid crystal panel. 175 denotes a reflection plate disposed below the light guide plate. Furthermore, with respect to the liquid crystal panel, the voltage is set so that a TN-type is used to afford the brightest state (it was the brightest state when applying no voltage.).

The measuring results of the brightness from the back light are shown in Table 7. A film having a thickness of about 20 m was selected. The Item "none" in Table 7 shows a case in which no anisotropic scattering device is used, which is taken as a standard value.

TABLE 7

Comparison of brightness of liquid crystal panel (due to difference in anisotropic scattering device)

|  | None (ref) | Titanium oxide (1) | Titanium oxide (2) | Titanium oxide (3) |
|---|---|---|---|---|
| Brightness (nit) | 140 | 230 | 200 | 190 |

As is apparent from Table 7, the luminance was largely improved in all anisotropic scattering devices. It has been found that the efficiency is the highest in case of titanium oxide (1) and the effect becomes larger as the short axis direction decreases.

Furthermore, the same measurement was carried out with respect to the other anisotropic scattering devices. The results of measurement are shown in Table 8.

In Table 8, the brightness was set to 100% in case of Ref. The results of a case where the reflection plate 25 under the light introducing plate was eliminated for comparison are also shown in Table 8. As is apparent from Table 8, when the reflection plate is present, any scattering device showed the effect. However, when the reflection plate is not present, the effect is small with respect to the anisotropic scattering device based on backward scattering. This agrees approximately with what has been described with respect to the use of the aforementioned backward scattering.

TABLE 8

Comparison of brightness between combinations of various anisotropic scattering devices and liquid crystal devices

| Scattering device | Volume % | Thickness (μm) | Brightness (%) with reflection plate | Brightness (%) without reflection plate |
|---|---|---|---|---|
| None (ref) | 0 | 0 | 100% | 100% |
| Glass fiber (1) | 33% | 10 | 125% | 123% |
| Glass fiber (1) | 33% | 20 | 140% | 135% |
| Glass fiber (1) | 33% | 60 | 142% | 120% |
| Glass fiber (2) | 33% | 20 | 120% | 118% |
| Glass fiber (2) | 33% | 60 | 130% | 127% |
| Silicon nitride | 33% | 10 | 140% | 138% |
| Silicon nitride | 33% | 40 | 142% | 115% |
| Silicon nitride | 33% | 80 | 160% | 105% |

<Embodiment 8>

The back light and the liquid crystal panel according to one embodiment of the present invention will be explained.

Figure 18:
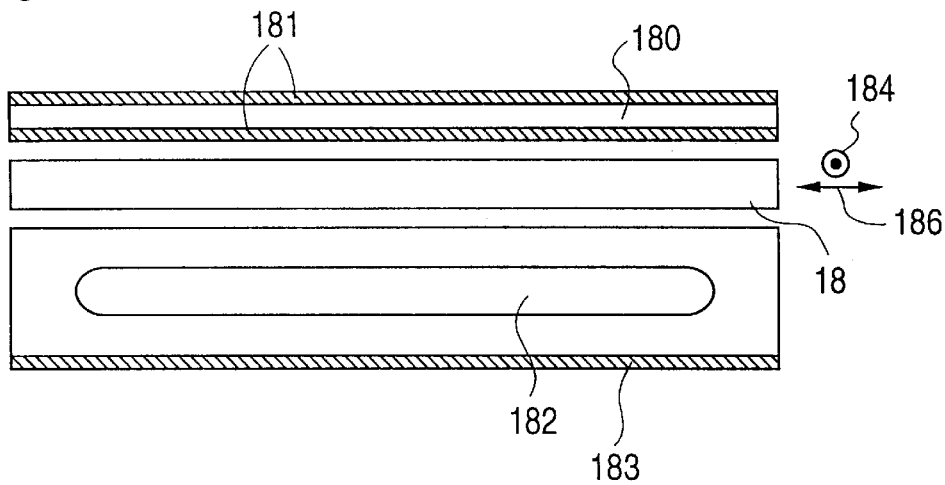
FIG. 18 is a schematic view showing a direct-under type back light or a liquid crystal panel according to the embodiment of the present invention.

As shown in FIG. 18, a phosphorescent light 181 was used as a direct-under type back light, and various anisotropic scattering devices 185 were disposed in a back light wherein a reflection plate 183 was provided at the back side of a phosphorescent light 182. Furthermore, a liquid crystal panel 180 provided with the polarizing plate 181 on both sides thereof was disposed according to the same manner as that described in Embodiment 7 and the transmittance of the liquid crystal panel 180 was measured. 184 denotes a polarizing axis at the back light side of the liquid crystal panel, and 186 denotes a transmission axis of the anisotropic scattering device 186. In any case, a bright state was obtained in the same way as Embodiment 7.

<Embodiment 9>

Figure 19:
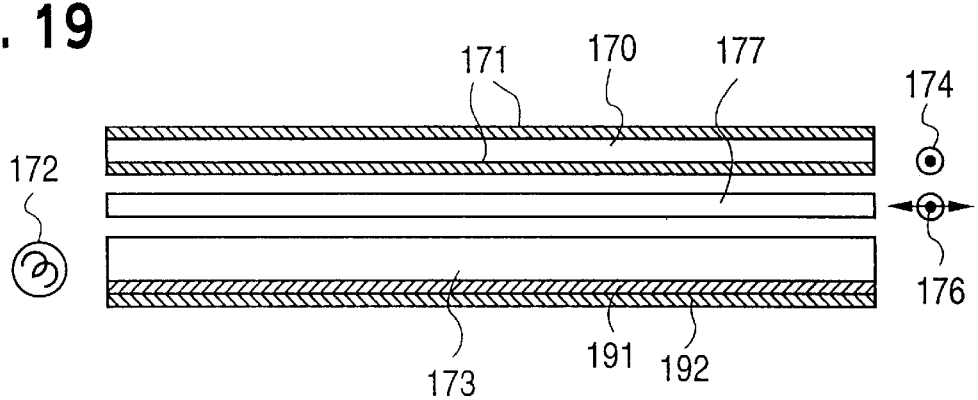
FIG. 19 a schematic view showing a liquid crystal panel in a case where the phase contrast plate according to the embodiment of the present invention is provided.

According to the same construction as that shown in Embodiment 7, a ¼λ plate 191 was provided on a reflection plate 192 as shown in FIG. 19. Since the other construction is the same as that of FIG. 2, the same parts are denoted by the same reference numerals, and an explanation thereof is omitted. A brightness of the liquid crystal panel at this time is shown in Table 9.

TABLE 9

Comparison of brightness of liquid crystal (in the case where the ¼λ plate 10 is inserted)

|  | None (ref) | Titanium oxide (1) | Titanium oxide (2) | Titanium oxide (3) |
|---|---|---|---|---|
| Brightness (nit) | 140 | 250 | 220 | 210 |

An improvement in luminance by about 10% was observed in the case where the ¼λ plate was inserted.

<Embodiment 10>

One embodiment of the case used for a reflection type liquid crystal panel will be explained hereinafter.

Figure 20:
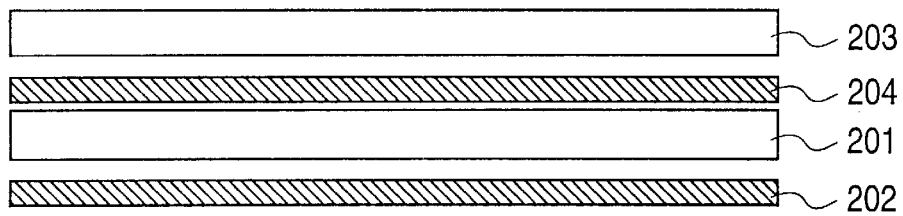
FIG. 20 is a schematic view showing a reflection type liquid crystal panel according to the embodiment of the present invention.

By using a liquid crystal panel of Embodiment 7, a reflection type liquid crystal panel was produced in an arrangement shown in FIG. 20. 201 denotes a liquid crystal panel, 202 denotes a reflection plate, and 203 denotes an anisotropic scattering device. A relation between the scattering axis of the anisotropic scattering device 203 and the polarizing axis of a polarizing plate 204 of the liquid crystal panel is the same as that of Embodiment 7. The brightness and contrast of various anisotropic scattering device were measured. The results are shown Table 10.

TABLE 10

Comparison of brightness and contrast between combinations of various anisotropic scattering devices and reflection type liquid crystal devices

| Scattering device | Volume % | Thickness (μm) | Brightness (%) | Contrast |
|---|---|---|---|---|
| None (ref) | 0 | 0 | 100% | 20 |
| Glass fiber (1) | 33% | 10 | 120% | 20 |
| Glass fiber (1) | 33% | 20 | 130% | 19 |
| Glass fiber (1) | 33% | 60 | 135% | 12 |
| Glass fiber (2) | 33% | 20 | 118% | 20 |
| Glass fiber (2) | 33% | 60 | 138% | 20 |
| Silicon nitride | 33% | 10 | 125% | 18 |
| Silicon nitride | 33% | 40 | 128% | 7 |
| Silicon nitride | 33% | 80 | 140% | 3 |

It has been found that the brightness was increased in all anisotropic scattering devices, but the contrast was decreased in anisotropic scattering devices having large backward scattering. It has been found that this is because external light was reflected due to backward scattering and devices based on forward scattering was preferred in case of the reflection liquid crystal panel.

<Embodiment 11>

Titanium oxide (1) as an anisotropic scattering particle used in Embodiment 1 was mixed with ZL14792 (manufactured by Merck Co., Ltd.) as a noematic liquid crystal material. At this time, a mixture ratio of ZL14792 to titanium oxide (1) was 7:3. An oriented film was formed by applying SE4110 on a glass substrate, followed by drying. By using a normal rubbing method, the upper and lower substrate were uniaxially oriented. A glass fiber (20 μm) as a spacer was dispersed on the substrate. A hollow panel having a uniform cell thickness was produced by pressure curing after a normal seal printing. At this time, a rubbing direction was set so that the direction is the same on the upper and the lower substrate. In this hollow panel, the aforementioned liquid crystal mixture was charged by a normal vacuum charging method, sealed by a normal method and then annealed at 150° C. for 1 hour. The liquid crystal panel was microscopically observed. As a result, titanium oxides as the anisotropic scattering particle were arranged approximately in a molecule orientation of the liquid crystal. The aforementioned liquid crystal panel was used as the anisotropic scattering device according to the same manner as that described in Embodiment 2. As a result, the brightness of the liquid crystal panel was improved by about 1.4 times.

Furthermore, it goes without saying that the liquid crystal can be arranged and the anisotropic scattering particle can be arranged by applying a magnetic field or an electric field without rubbing.

As a matter of course, by using a liquid crystal monomer in small amounts or as the whole liquid crystal component, the titanium oxide particle can be fixed (for example, a drop in gravity due to a difference in specific weight can be prevented) by curing with ultraviolet light.

<Embodiment 12>

When the liquid crystal panel was produced according to the same manner as that described in Embodiment 11, the rubbing auxeses were allowed to intersect perpendicularly with each other on the upper and lower substrates, thereby producing a so-called 90 degree twisted noematic panel (hereinafter abbreviated to a "TN panel"). At this time, the pitch of S811 (manufactured by Merck Co., Ltd.) as a chiral agent was set to 100 μm. At this time, the cell thickness was set to 20 μm.

When this TN panel was used as the anisotropic scattering device according to the same manner as that described in Embodiment 4, the luminance increased by 1.4 times. It has been found that the dependency on the view angle was small in a visual inspection.

As a matter of course, stabilization can be carried out by using the liquid crystal monomer according to the same manner as that described in Embodiment 4.

As is apparent from the aforementioned explanation, according to the present invention, (1) by using an anisotropic scattering device, particularly particle having a different aspect ratio, a stable and effective polarization conversion device can be obtained so that the brightness of the back light and the liquid crystal panel can be largely improved;

(2) by using in combination with the phase contrast plate (e.g. ¼λ plate, etc.), the polarization conversion can be more efficiently carried out and the brightness of the device can be improved; and (3) by arranging using a liquid crystal, a twisted structure of the anisotropic scattering device can be obtained and the angle dependency can be improved.

What is claimed is:

1. An anisotropic scattering device comprising:
    a scattering particle having an aspect ratio of 1 or more, a refractive index, and an anisotropy to polarized light in a short axial direction and a long axial direction; and
    a supporting medium having a refractive index different from the refractive index of said scattering particle, said scattering particle being dispersed and arranged in said supporting medium, wherein the short axis length of said scattering particle is within a Rayleigh scattering region and downward while the long axis length is within a Mie scattering region or a geometric scattering region and has an anisotropy to a polarizing component of the polarized light.

2. The anisotropic scattering device according to claim 1, for use with a polarizing device, wherein said anisotropic scattering device is designed to coincide a transmitting axis thereof with a polarizing axis of the polarizing device.

3. The anisotropic scattering device according to claim 1, wherein said scattering particle has a twisted structure in arrangement.

4. The anisotropic scattering device according to claim 1, wherein said scattering particle is one selected from a group consisting of titanium oxide, zirconium oxide, zinc oxide, silicone carbide, silicon nitride, silicon carbide, aluminum borate and glass.

5. The anisotropic scattering device according to claim 1, wherein said supporting medium has a light-transmitting property.

6. The anisotropic scattering device according to claim 1, wherein said supporting medium is composed of a resin or polymer material.

7. The anisotropic scattering device according to claim 1, wherein a thickness of said anisotropic scattering device is 3 μm or more.

8. The anisotropic scattering device according to claim 1, wherein a number of said scattering particle arranged in a thickness direction is 3 or more.

9. The anisotropic scattering device according to claim 1, wherein unidirectional arrangement of a plurality of said scattering particles in said supporting medium is made by application of an electric field or a magnetic field, or application of a unidirectional stretching or a shear stress.

10. The anisotropic scattering device according to claim 1, wherein said supporting medium is a liquid crystal and a plurality of said scattering particles are dispersed in said liquid crystal.

11. The anisotropic scattering device according to claim 10, wherein said scattering particle is fixed by arranging with said liquid crystal and polymerizing a polymerizable component in said liquid crystal.

12. An anisotropic scattering device comprising:
a scattering particle having a refractive index and an aspect ratio of 1 or more; and
a supporting medium having a refractive index different from the refractive index of said scattering particle, said scattering particle being dispersed and arranged in said supporting medium wherein a short length of said scattering particle is shorter than a wavelength of light to be used.

13. The anisotropic scattering device according to claim 12, for use with a polarizing device, wherein said anisotropic scattering device is designed to coincide a transmitting axis thereof with a polarizing axis of the polarizing device.

14. The anisotropic scattering device according to claim 12, wherein said scattering particle has a twisted structure in arrangement.

15. The anisotropic scattering device according to claim 12, wherein said scattering particle is one selected from a group consisting of titanium oxide, zirconium oxide, zinc oxide, silicone carbide, silicon nitride, silicon carbide, aluminum borate and glass.

16. The anisotropic scattering device according to claim 12, wherein said supporting medium has a light-transmitting property.

17. The anisotropic scattering device according to claim 12, wherein said supporting medium is composed of a resin or polymer material.

18. The anisotropic scattering device according to claim 12, wherein a thickness of said anisotropic scattering device is 3 μm or more.

19. The anisotropic scattering device according to claim 12, wherein a number of said scattering particle arranged in a thickness direction is 3 or more.

20. The anisotropic scattering device according to claim 12, wherein unidirectional arrangement of a plurality of said scattering particles in said supporting medium is made by application of an electric field or a magnetic field, or application of a unidirectional stretching or a shear stress.

21. The anisotropic scattering device according to claim 12, wherein said supporting medium is a liquid crystal and a plurality of said scattering particles are dispersed in said liquid crystal.

22. The anisotropic scattering device according to claim 21, wherein said scattering particle is fixed by arranging with said liquid crystal and polymerizing a polymerizable component in said liquid crystal.

23. An anisotropic scattering device comprising:
a scattering particle having a refractive index, and an aspect ratio of 1 or more; and
a supporting medium having a refractive index different from the refractive index of said scattering particle, said scattering particle being dispersed and arranged in said supporting medium, wherein a difference in refractive index between said scattering particle and said supporting medium is 0.05 or more.

24. The anisotropic scattering device according to claim 23, for use with a polarizing device, wherein said anisotropic scattering device is designed to coincide a transmitting axis thereof with a polarizing axis of the polarizing device.

25. The anisotropic scattering device according to claim 23, wherein said scattering particle has a twisted structure in arrangement.

26. The anisotropic scattering device according to claim 23, wherein said scattering particle is one selected from a group consisting of titanium oxide, zirconium oxide, zinc oxide, silicone carbide, silicon nitride, silicon carbide, aluminum borate and glass.

27. The anisotropic scattering device according to claim 23, wherein said supporting medium has a light-transmitting property.

28. The anisotropic scattering device according to claim 23, wherein said supporting medium is composed of a resin or polymer material.

29. The anisotropic scattering device according to claim 23, wherein a thickness of said anisotropic scattering device is 3 μm or more.

30. The anisotropic scattering device according to claim 23, wherein a number of said scattering particle arranged in a thickness direction is 3 or more.

31. The anisotropic scattering device according to claim 23, wherein unidirectional arrangement of a plurality of said scattering particles in said supporting medium is made by application of an electric field or a magnetic field, or application of a unidirectional stretching or a shear stress.

32. The anisotropic scattering device according to claim 23, wherein said supporting medium is a liquid crystal and a plurality of said scattering particles are dispersed in said liquid crystal.

33. The anisotropic scattering device according to claim 32, wherein said scattering particle is fixed by arranging with said liquid crystal and polymerizing a polymerizable component in said liquid crystal.

34. An anisotropic scattering device comprising:
a scattering particle having a refractive index, and an aspect ratio of 1 or more; and
a supporting medium having a refractive index different from the refractive index of said scattering particle, said scattering particle being dispersed and arranged in said supporting medium, wherein a volume fraction of said supporting medium in said scattering particle is 3% or more.

35. The anisotropic scattering device according to claim 34, for use with a polarizing device, wherein said anisotropic scattering device is designed to coincide a transmitting axis thereof with a polarizing axis of the polarizing device.

36. The anisotropic scattering device according to claim 34, wherein said scattering particle has a twisted structure in arrangement.

37. The anisotropic scattering device according to claim 34, wherein said scattering particle is one selected from a group consisting of titanium oxide, zirconium oxide, zinc oxide, silicone carbide, silicon nitride, silicon carbide, aluminum borate and glass.

38. The anisotropic scattering device according to claim 34, wherein said supporting medium has a light-transmitting property.

39. The anisotropic scattering device according to claim 34, wherein said supporting medium is composed of a resin or polymer material.

40. The anisotropic scattering device according to claim 34, wherein a thickness of said anisotropic scattering device is 3 μm or more.

41. The anisotropic scattering device according to claim 34, wherein a number of said scattering particle arranged in a thickness direction is 3 or more.

42. The anisotropic scattering device according to claim 34, wherein unidirectional arrangement of a plurality of said scattering particles in said supporting medium is made by application of an electric field or a magnetic field, or application of a unidirectional stretching or a shear stress.

43. The anisotropic scattering device according to claim 34, wherein said supporting medium is a liquid crystal and a plurality of said scattering particles are dispersed in said liquid crystal.

44. The anisotropic scattering device according to claim 43, wherein said scattering particle is fixed by arranging with said liquid crystal and polymerizing a polymerizable component in said liquid crystal.

45. An anisotropic scattering device comprising:

a scattering particle having a refractive index, and an aspect ratio of 1 or more; and a supporting medium having a refractive index different from the refractive index of said scattering particle, said scattering particle being dispersed and arranged in said supporting medium, wherein a difference in refractive index between said scattering particle and said supporting medium or a density of said scattering particle in said supporting medium is within a range based on backward scattering and/or within a range based on forward scattering.

46. The anisotropic scattering device according to claim 45, for use with a polarizing device, wherein said anisotropic scattering device is designed to coincide a transmitting axis thereof with a polarizing axis of the polarizing device.

47. The anisotropic scattering device according to claim 45, wherein said scattering particle has a twisted structure in arrangement.

48. The anisotropic scattering device according to claim 45, wherein said scattering particle is one selected from a group consisting of titanium oxide, zirconium oxide, zinc oxide, silicone carbide, silicon nitride, silicon carbide, aluminum borate and glass.

49. The anisotropic scattering device according to claim 45, wherein said supporting medium has a light-transmitting property.

50. The anisotropic scattering device according to claim 45, wherein said supporting medium is composed of a resin or polymer material.

51. The anisotropic scattering device according to claim 45, wherein a thickness of said anisotropic scattering device is 3 μm or more.

52. The anisotropic scattering device according to claim 45, wherein a number of said scattering particle arranged in a thickness direction is 3 or more.

53. The anisotropic scattering device according to claim 45, wherein unidirectional arrangement of a plurality of said scattering particles in said supporting medium is made by application of an electric field or a magnetic field, or application of a unidirectional stretching or a shear stress.

54. The anisotropic scattering device according to claim 45, wherein said supporting medium is a liquid crystal and a plurality of said scattering particles are dispersed in said liquid crystal.

55. The anisotropic scattering device according to claim 54, wherein said scattering particle is fixed by arranging with said liquid crystal and polymerizing a polymerizable component in said liquid crystal.

* * * * *